May 28, 1935. N. LESSER 2,002,669
TRACTOR
Filed Jan. 17, 1934 3 Sheets-Sheet 2
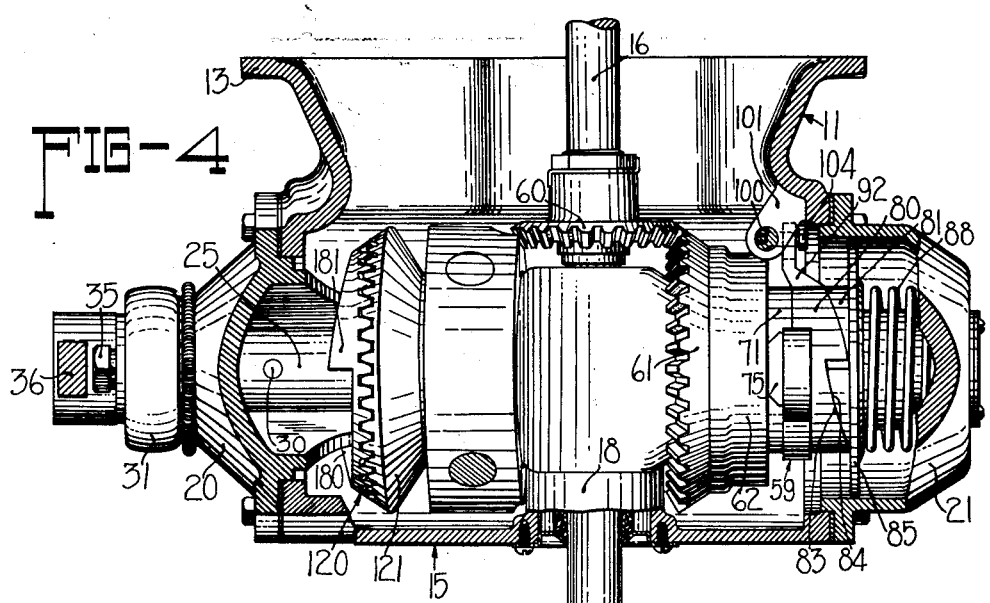
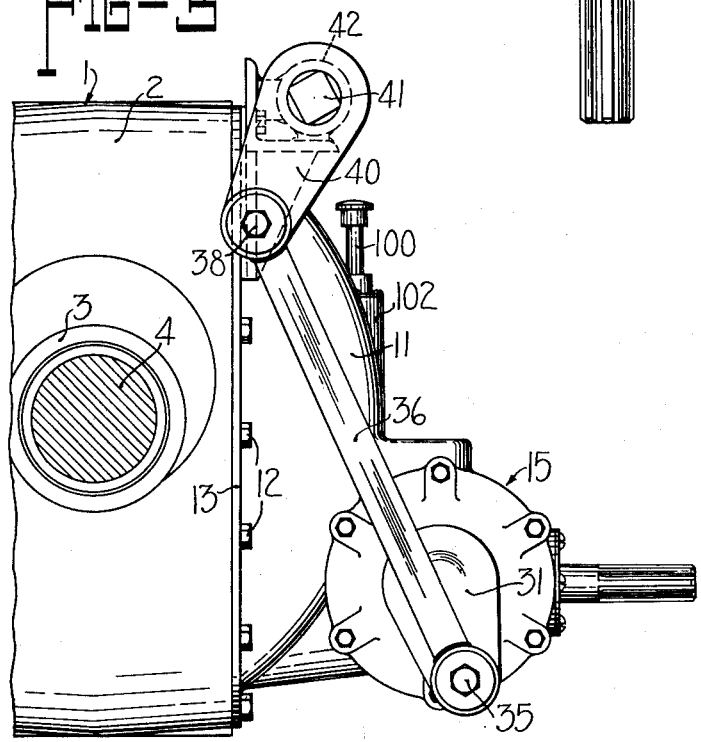
INVENTOR
Nathan Lesser
BY Brown, Jackson, Boettcher & Dienner
ATTORNEYS.

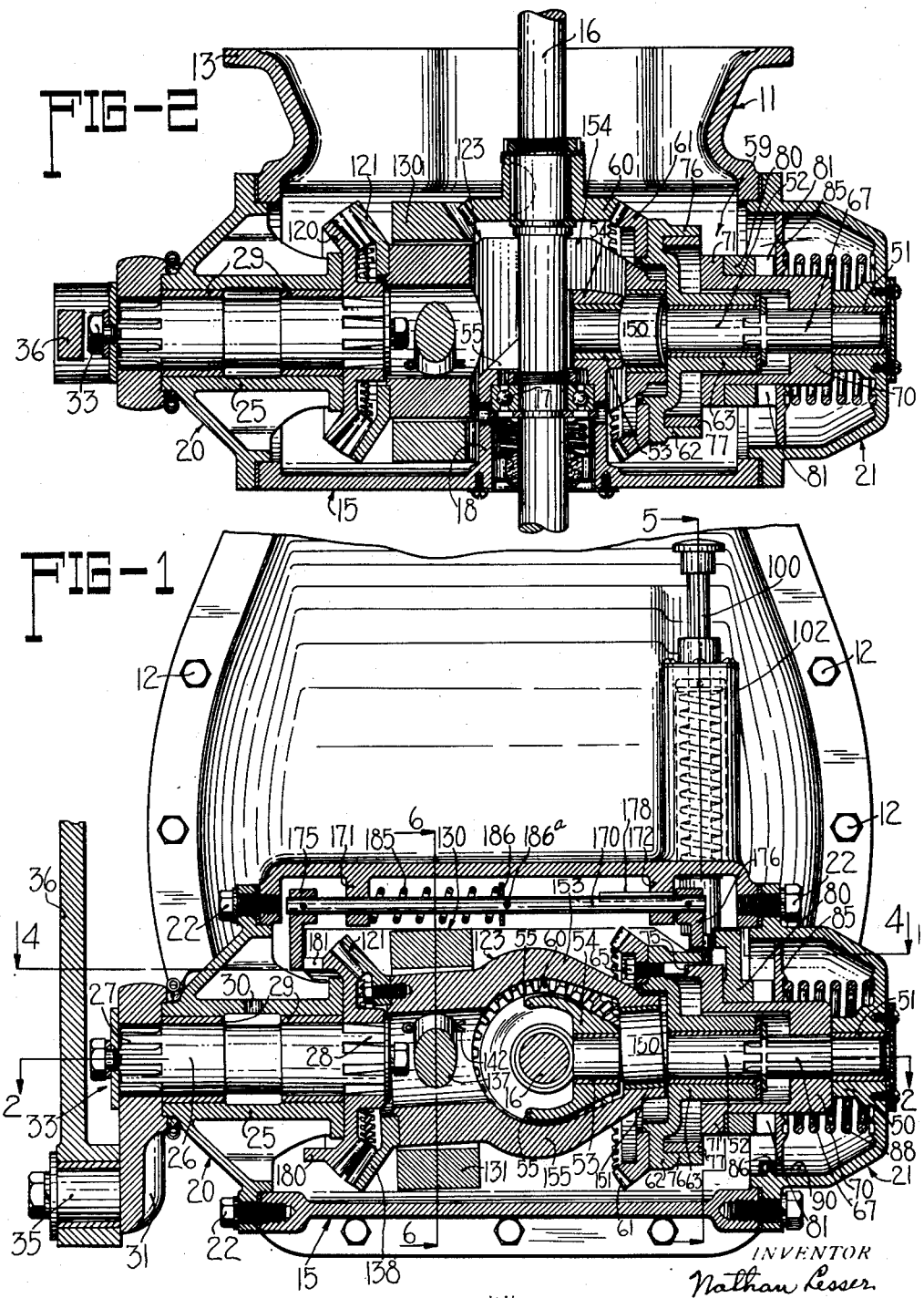

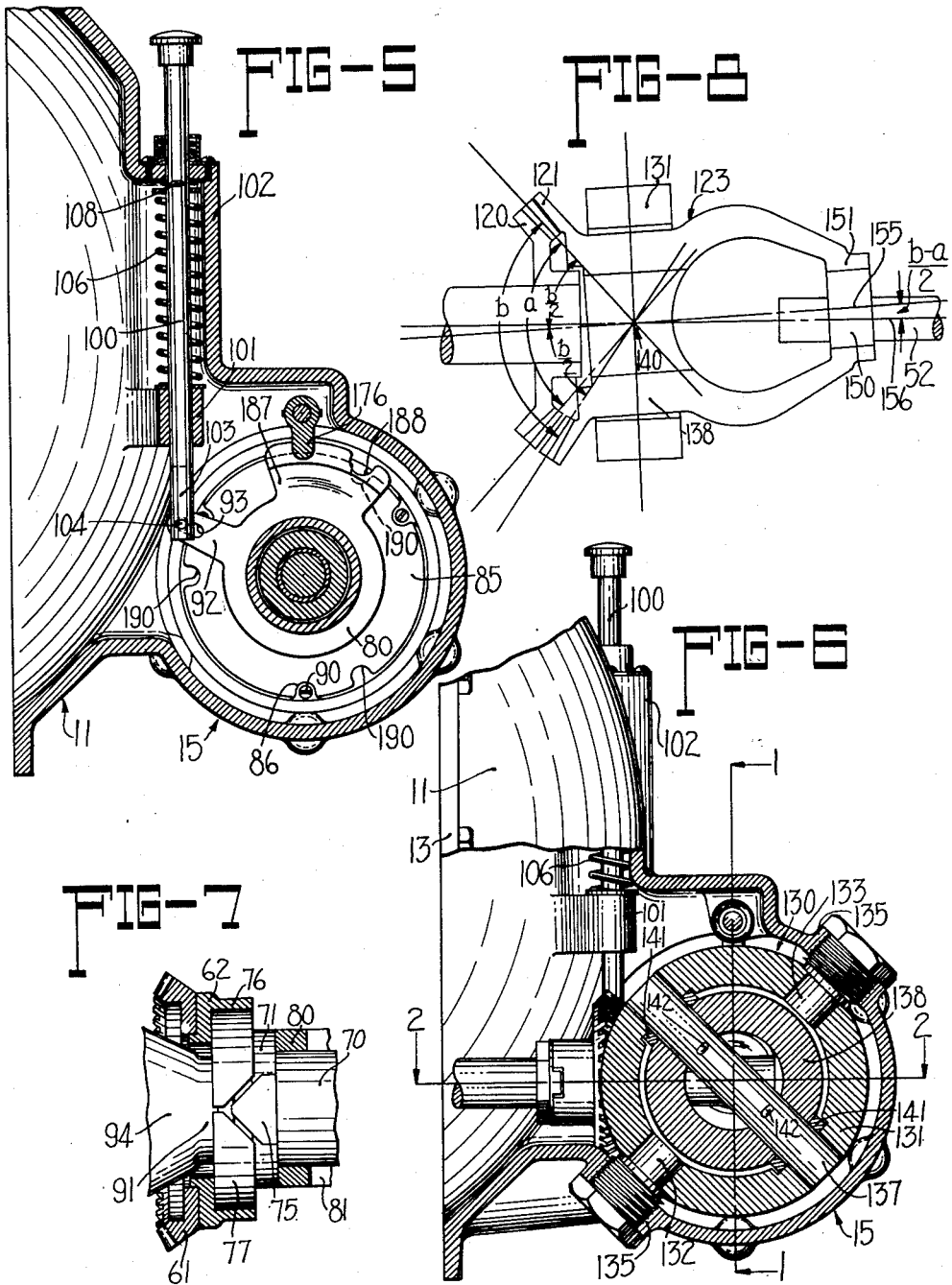

Patented May 28, 1935

2,002,669

UNITED STATES PATENT OFFICE 2,002,669

TRACTOR

Nathan Lesser, Moline, Ill., assignor to John Deere Tractor Company, Waterloo, Iowa, a corporation of Iowa Application January 17, 1934, Serial No. 706,935

17 Claims. (Cl. 97—50)

The present invention relates to tractors having power take-off mechanism arranged to operate implements associated with the tractor and also arranged to raise and lower tools and perform other or similar services in connection with such implements.

One of the principal objects of the present invention is the provision of novel means for delivering power from the relatively high speed power take-off shaft to the relatively low speed lifting crank or other means for raising or lowering the implement tools and the like. Another important object of the present invention is to effect the desired speed reduction by the use of epicyclic mechanism which is arranged in a compact manner on the tractor and is less expensive and longer lived than the usual type of speed reduction means in use at the present time.

Another important object of the present invention is the provision of improved supporting means for the bearings of the epicyclic gearing mechanism, by virtue of which the parts may be supported on the tractor simply and sturdily and with the minimum requirement for space.

Still further, another important object of the present invention is the provision of new and useful means for interrupting the transmission of power through the speed reduction mechanism in accordance with the extent of rotation of the driven part or parts.

These and other objects of the present invention will be apparent to those skilled in the art after a consideration of the following detailed description of a preferred structural embodiment, taken in connection with the accompanying drawings illustrating such embodiment.

In the drawings:

Figure 1 is a rear elevation of a portion of the tractor with the power lift parts being shown in a section taken along the line 1—1 of Figure 6;

Figure 2 is a horizontal section taken along the line 2—2 of Figure 1;

Figure 3 is a side view looking toward the left side of the rear end of the tractor;

Figure 4 is a section taken along the line 4—4 of Figure 1;

Figure 5 is a section taken along the line 5—5 of Figure 1;

Figure 6 is a section taken along the line 6—6 of Figure 1;

Figure 7 is a fragmentary section, illustrating a portion of the optionally controlled clutch mechanism; and Figure 8 is a diagrammatic view illustrating certain of the geometrical principles employed in the present invention.

Referring now to the drawings, the farm tractor to which the present invention is preferably applied is of conventional construction well known in the art and is of the type embodying a rear axle housing 1 of the kind generally referred to as of the banjo type and including a generally cylindrical central section 2 and tubular housing sections 3 in which driving axle shafts 4 are journaled. The farm tractor includes motor driven mechanism for driving the axle shafts 4, and this mechanism is usually provided with differential means disposed within the central housing section 2 and driven by shaft means (not shown) connected through suitable transmission gearing with the motor of the tractor.

The power lift mechanism of the present invention is supported by and enclosed within a housing 11 bolted, as by cap screws 12, over the rear opening of the central section 2 of the rear axle housing 1 of the tractor. The power lift mechanism housing 11 includes a flanged section 13 receiving the bolts 12, and formed integral with the housing 11 is a cylindrical portion 15 disposed generally transversely with respect to the tractor and open at both ends, as best shown in Figures 1, 2 and 4.

The tractor is one which is adapted for driving various implement mechanisms which may be associated therewith, and to this end, I provide a longitudinally extending power take-off shaft 16 journaled in a bearing 17 which is supported in an inwardly extending tubular bearing supporting boss 18 preferably formed integral with the rear wall of the cylindrical section 15 and extending forwardly therefrom near the middle of the wall, as best indicated in Figure 2. The rear end of the power take-off shaft 16 is provided with any suitable means (not shown), such as a universal joint, by which the implement mechanism or the shaft means thereof may be connected to be driven by the motor of the tractor, and the forward end of the power take-off shaft 16 is connected in any suitable manner with the driving mechanism of the tractor.

The two outer ends of the cylindrical portion 15 are closed by means of caps 20 and 21, and these caps are suitably fixed to the cylindrical housing 15 by suitable means, such as cap screws 22. The left hand cap 20 is provided with a relatively long bearing sleeve 25, best shown in Figures 1 and 2, and journaled in this bearing supporting sleeve, which is preferably formed integral with the cap 20, is a crank shaft 26 having splines 27 and 28 at the opposite ends thereof. The crank shaft 26 is provided with a lubricant hole 30 intermediate the bearings 29. The outer end of the crank shaft 26 extends outside the cap 20 and has a crank 31 secured thereto, as by a washer and cap screw assembly 33. The crank 31 carries a crank pin 35 which receives one end of a thrust rod 36, the other end of which is pivoted, as at 38 (Figure 3), to one end of an arm 40 fixed on a lifting rock shaft 41 journaled in bearings 42 supported in any suitable manner on the tractor. The lifting rock shaft 41 is adapted to be operatively connected with implement tools or the like for raising and lowering or otherwise controlling the position of the latter.

The lifting crank shaft 26 is adapted to be driven from the power take-off shaft 16 by suitable gear reduction means and suitable controlling clutch means which will now be described.

The other cap 21 is provided with an inwardly extending bearing supporting sleeve 50 in which is disposed a bearing 51 which serves to support the outer end of a jack shaft 52. The inner end of the jack shaft 52 is supported by bearing means 53 carried in a forward extension 54 which is preferably formed integral with the inwardly extending bearing sleeve 18 carried by the rear wall of the cylindrical housing section 15, as best shown in Figures 1 and 2. The forward extension or bearing supporting collar 54 is reinforced by suitable flanges 55 preferably formed integral with the extension 54 and the yoke bearing supporting sleeve 18.

The jack shaft 52 is driven by means of a suitable power connection with the power take-off shaft 16, which power connection preferably includes an optionally controlled clutch of the self interrupting type indicated in its entirety by the reference numeral 59. For this purpose the power take-off shaft 16 is provided with a bevel gear 60 suitably keyed or otherwise fixed thereto, and the bevel gear 60 meshes with a companion gear 61 mounted on the flanged section 62 formed on a sleeve 63 journaled on the jack shaft 62 adjacent the inner end thereof but between the bearings 51 and 53 for the jack shaft. Preferably, the bevel gear 61 is fixed to the flange 62 by means of suitable cap screws 65, as best shown in Figure 1. The jack shaft 52 is splined adjacent the outer end thereof, as indicated at 67, and slidably mounted on this splined section is a shiftable sleeve 70 having a radially outwardly extending flange 71 disposed adjacent the flanged section 62 of the sleeve 63.

The sleeve 70 is provided with internal splines engaging the splines 67, whereby the sleeve 70 rotates with the jack shaft 52. The sleeve 70 is free to slide axially with respect to the jack shaft 52 and is provided with a tapered lug 75, preferably formed integral with the flange 71 and extending in a generally axial direction, as best shown in Figures 1, 4 and 7. The flange 62 carries an axially extending rim 76 formed integral therewith, and within this rim is an expansible split ring 77, the ends of which are beveled, as best shown in Figure 7, and are disposed adjacent the tapered lug 75 to be engaged thereby whenever the sleeve 70 is moved inwardly, to the left as viewed in Figures 1, 2 and 7. The lug 75 acts against the bevel ends of the ring 77 to expand the same against the rim 76 carried by the sleeve 63 which, in turn, carries the bevel gear 61. Thus, the driving force is transmitted from the power take-off shaft 16 through the gears 60 and 61 to the sleeve member 63, and from this member the power is transmitted through the splined member 70 to the jack shaft 52. The expansible split ring 77 is resilient so that when the tapered lug 75 is withdrawn the ring 77 contracts inwardly out of engagement with the rim 76.

The means for controlling the axial shifting movements of the splined sleeve 70 for governing the application of power to the jack shaft 52 will now be described. The mechanism for sliding the sleeve 70 upon the jack shaft 52 comprises a pair of ring members 80 and 81 which are journaled upon the sleeve member 70. These sleeve members 80 and 81 are best shown in Figure 4, from which figure it will be observed that these members are provided with a series of opposed cam surfaces 83 and 84 of such a nature that relative rotation of one member with respect to the other causes them to separate in an axial direction. The ring member 81 has a circular plate 85 preferably formed integral therewith and is normally held against three spaced lugs 86 which are formed integral with the cap 21 by a coil spring 88 which bears against the back of the plate 85 and against the end of the cap 21, as clearly shown in Figures 1, 2 and 4. The plate 85 is held against rotation by pins 90 disposed in slots formed in the edge of the plate 85, and the pins are long enough to permit a certain amount of axial movement of the plate 85.

The ring member 80 is provided with an arm 92, preferably formed integral therewith, and in the end of the arm 92 a slot 93 is provided, as best shown in Figure 5. A vertically disposed plunger 100 is slidably mounted in the housing 11 and is disposed in a boss 101 and extends at its upper end through an opening in a vertically disposed cylindrical housing section 102. The lower end 103 of the plunger 100 carries a bolt or pin 104 which is disposed within the slot 93 at the outer end of the arm 92. A spring 106 surrounds the plunger 100 and bears at its lower end against the boss 101 and at its upper end against a key or pin 108 carried by the plunger 100. Thus, the spring 106 serves to hold the plunger in its upper position, that shown in Figure 5, which disposes the arm 92 in its upper position.

By stepping on or otherwise depressing the plunger 100 against the tension of its spring 106, the ring member 80 will be rotated relative to the companion ring member 81, and this, in turn, will cause the two ring members to separate. The ring member 80 bears against the flange 71, while the ring member 81 bears against the spring 88, and as a result of this arrangement the pressure of the spring 88 will cause the sleeve member 70 and the tapered lug 75 to be shifted axially toward the left as viewed in Figures 1 and 7. This forces the tapered wedge 75 in between the ends of the expansible ring 77, causing the latter to frictionally engage the rim 76 and establish a driving connection between the power take-off shaft 16 and the jack shaft 52 as described above. During this clutching engagement, the plate member 85 is adapted to have a limited amount of axial movement on the pins 90. Thus, whenever the plunger 100 is depressed, a driving connection is established between the power take-off shaft 16 and the jack shaft 52.

The jack shaft 52 is operatively connected with the crank shaft 26 to rotate the latter by means of a speed reducing epicyclic gearing mechanism which provides the desired gear reduction for operating tool or implement lifting mechanism, the speed of movement of which is relatively low, from the power take-off shaft, which normally rotates at an appreciable rate.

The epicyclic gearing is best shown in Figures 1 and 2. An external bevel gear 120 is mounted on the inner splined end 28 of the crank shaft 26 and an internal bevel gear 121 is adapted to have one portion in mesh with the bevel gear 120 and is securely fixed, as by cap screws, to a rocking or gyratory member 123. The member 123 is supported for gyratory movement in the casing 15 by means serving as a gimbal or universal joint to accommodate the rocking movement of the member 123 but which is so constructed and arranged that rotation of the member 123 about its own axis is prevented. The universal joint support is indicated by the reference numeral 130 and comprises a ring 131 journaled on axially aligned pivot pins 132 and 133 having threaded portions screwed into threaded bosses 135 formed on the housing 15 as best shown in Figure 6. Thus, the ring member 121 is capable of rocking movement about an axis, defined by the pins 132 and 133, which is inclined upwardly and rearwardly with respect to the tractor. The ring member 131 carries a transverse pin 137 disposed with its axis disposed at right angles to but in the same plane as the axis of the pins 132 and 133. A member 138 is rockably mounted on the pin 137 and is thus capable of movement about an axis disposed at right angles to the axis of movement of the member 131 on which the member 138 is supported in the casing 15. The member 138, in effect, constitutes a part of the gyratory member 123 and serves, in connection with the pivots 132 and 133 and the pivot 137, to define a point about which the member 123 swings as a center. In Figure 8, which will be referred to later and which is a diagrammatic illustration of the geometric principles involved, this point or center is indicated by the reference numeral 140 and lies at the intersection of the lines shown. This universal joint connection 130 between the member 123 and the housing 115, while holding the member 123 and the gear 121 fixed thereto against rotation about its own axis, permits the member 123 to have limited rocking or gyratory movement about the center 140. From Figure 8 it will be observed that the crank shaft 24 and the jack shaft 52 are in axial alignment and that the point 140 lies in their common axis. The inner ends of the crank shaft 24 and the jack shaft 52 are spaced apart to accommodate the gyratory member 123 and associated parts. Since the point 140, about which the member 123 rocks, lies in the common axis of the shafts 24 and 52, the member 123 is thus capable of limited rocking movement about any axis which is perpendicular to the common axis of the shafts 24 and 52.

Thrust washers 141 are interposed between the member 138 and the ring member 131, and cotter keys 142 are inserted in suitable openings in the pin 137 and cooperate with the member 131 in retaining the pin 137 in position.

An eccentric 150, in the form of a generally cylindrical member, is formed on or carried by the jack shaft 52 and is embraced by a follower in the form of a ring or collar 151, suitable antifriction means being interposed between the cylindrical eccentric 150 and the collar 151. The latter is connected with the gyratory member 123 by means of two diametrically opposed generally axially extending arms 153 and 154 which are disposed on opposite sides of not only the power take-off shaft 16 but also the bearing supporting means 18—54 for the rear end of the power take-off shaft 16 and the inner end of the jack shaft 52. From Figure 8 it will be noted that the axis of the cylindrical portion 150 extends at an angle with respect to the axis of the jack shaft 52 and intersects the common axis of the shafts 24 and 52 at point 140. This point also marks the apex of the pitch cones of the bevel gears 120 and 121. In Figure 8 the pitch cone of the gear 120 is indicated at $a$ and the pitch cone for the larger bevel gear 121 is indicated by the reference character $b$. The point 140 lies at the common apex of the pitch cones $a$ and $b$ of the bevel gears 120 and 121, and this point lies in the transverse plane of the axes of the pins 132 and 133 and the pin 137.

As a result of these relationships, the rotation of the jack shaft 52, carrying with it the eccentric 150, will cause the common axis 155 (Figure 8) of the bevel gear 121, the gyratory member 123 and the eccentric 150, to generate a right circular cone, the axis of which cone coincides with the common axis 156 of the shafts 24 and 52 and the gear 120. The crank throw of the eccentric 150 is such that the included angle of the right circular cone generated by the axis 155 is equal to the difference between the included angles of the pitch cones of the bevel gears 120 and 121.

By virtue of the above relationships, proper and uniform depth of tooth engagement around the entire periphery of the bevel gears 120 and 121 is secured, and each time the gear 121 is caused to generate one cone, the gear 120 will be forced to rotate an amount which is proportional to the difference between the number of the teeth on the gears 120 and 121. For example, if gear member 120 is provided with forty teeth and the gear member 121 is provided with forty-two teeth, the gear 120 and the crank shaft 24 will be rotated 1/20 of a revolution, and in this case the gear reduction between the crank shaft 24 and the jack shaft 52 is 1 to 20. Thus, as long as the plunger 100 is held depressed to cause separation of the ring members 80 and 81, the clutch is held in operative engagement and power is transmitted from the power take-off shaft 16 to the power lift crank 26 at a ratio which depends upon the gears 60 and 61 and the ratio established by the epicyclic gear reduction described above.

Means have been provided for automatically holding the clutch in engagement, even after the plunger 100 is released, until the crank 26 has completed a half revolution. This mechanism comprises a rod 170 slidably but non-rotatably mounted in lugs 171 and 172 (Figure 1) formed integral with and depending from the upper portion of the housing 15. The rod 170 is provided at one end with an arm 175 depending therefrom and fixed thereto, and at the other end another arm 176 is fixed to the rod. A key 178 or the equivalent, cooperating with the lug 172, serves to prevent rotation of the rod 170 about its own axis and thereby holds the arms 175 and 176 in the desired position. The external bevel gear 120 is provided with a pair of diametrically opposed cams 180 and 181, as best shown in Figure 1, and these cams are arranged to engage, one at a time, the arm 176 for normally holding the rod 170 in the position shown in Figure 1. A spring 185, disposed between the lug 171 and a washer 186 held in place by a pin 186a, serves to bias the rod 170 for movement toward the right as viewed in Figure 1.

A radially extending plate sector 187 is formed integral with the ring member 80 of the clutch, as best shown in Figure 5, and this plate sector 187 is provided with a slot 188 therein which is adapted to be brought into alignment with the lower end of the arm 176 on the rod 170 whenever the plunger 100 is depressed to swing the ring member 80 in a counter-clockwise direction, as best seen in Figure 5. It will be remembered that depressing the plunger 100 causes the ring members 80 and 81 to separate, thus engaging the clutch and connecting the jack shaft 52 to be driven by power from the power take-off shaft 16. As explained above, the rotation of the jack shaft 52 causes the gyratory member 123 to impart a relatively slow rotation to the crank shaft 26, and as soon as the crank shaft 26 rotates a slight amount, the cam 181 (Figure 1) on the gear 120, or the cam 180 if the crank shaft 26 is in a position 180 degrees from the position shown in Figure 1, is moved out of the path of the arm 175. The spring 185 then shifts the rod 170 to the right, as viewed in Figure 1, and causes the arm 175 to engage in the slot 188 (Figure 5), and the engagement of the arm 176 in the notch 188 effectively prevents the rotation of the ring member 80 back to the position shown in Figure 5, even though the operator releases the pressure on the plunger 100. The driving engagement between the power take-off shaft 16 and the jack shaft 52 is consequently maintained and the crank shaft 26 continues to rotate, but the continued rotation of the crank shaft 26 serves to advance the opposite cam 180 toward the arm 175, and as the crank shaft 26 approaches a position 180 degrees from the position shown in Figure 1, the cam 180, which is shaped similar to the cam 181, bears against the arm 175 and gradually shifts the rod 170 toward the left as viewed in Figure 1. As soon as the rod 100 is moved to the left to a position where the arm 176 will disengage from the notch 188, the spring 106, acting through the plunger 100, will rotate the clutch member 80 back to the position shown in Figure 5, thus interrupting the transmission of power from the power take-off shaft 16 to the jack shaft 52. Consequently, no further rotation of the crank shaft 26 can take place until the plunger 100 is again depressed.

No special locking means for holding the crank shaft 26 in either of its two positions need be provided because the epicyclic gear reduction mechanism described above is irreversible and therefore self-locking. It is, further, to be understood that more than two cams 180 and 181 may be provided on the bevel gear or on the crank 26, or if desired only one cam may be provided. In the former case, the crank 26 will be rotated somewhat less than a half revolution, while in the latter case the crank will make one complete revolution before the transmission of power to the jack shaft is interrupted by the operation of the rod 170 and associated parts. It is not essential to the present invention that the power lift mechanism operate a lifting rock shaft 41 for, if desired, implement tools or other parts to be raised and lowered can be connected directly with the crank 31.

The plate 85 embracing the slidable clutch member 70 is provided with three spaced notches 190 to facilitate assembling the clutch member in position. To mount this member, the plate 85 is positioned with the notches 190 aligned with the lugs 86 carried on the cap member 21. The spring 88 is disposed between the plate 85 and the back of the cap 21, and then the plate 85 is forced against the tension of the spring 88 until it has been moved past the lugs 86. Then the plate 85 is rotated about its own axis to the position shown in Figure 5, after which the pins 90 are screwed in position, the ends thereof engaging in the notches or slots provided in the plate 85 for their reception.

An important feature of the present invention lies in the fact that if a purchaser does not wish the power lift mechanism at the time he purchases the tractor but does wish a power take-off shaft, the cover plate casting 11, together with the bearing portion 18 for supporting the power take-off shaft, can be provided and all of the other parts constituting the power lift mechanism can be omitted. In that case, sheet metal covers or the like will be provided over the openings in which the caps 20 and 21 are ordinarily received. If subsequently the purchaser desires to add the power lift to the tractor, the parts constituting the lift mechanism and including the caps 20 and 21 can be readily furnished and placed in position.

While I have described above the preferred structure in which the principles of this invention have been embodied, it is to be understood that my invention is not to be limited to the specific means shown and described, but that, in fact, widely different means may be employed in the practice of the broader aspects of my invention.

What I claim, therefore, and desire to secure by Letters Patent is:

1. An epicyclic gearing transmission mechanism comprising, in combination, an external bevel gear, a member including an internal bevel gear having a greater number of teeth than said external bevel gear, means supporting said member to position said internal bevel gear to engage said external bevel gear, said supporting means also being arranged to hold said member against rotation about its own axis, and means for causing said member to move so that the axis of said internal bevel gear generates a right circular cone the axis of which cone coincides with the axis of said external bevel gear.

2. An epicyclic gearing transmission mechanism comprising, in combination, an external bevel gear, a member including an internal bevel gear having a greater number of teeth than said external bevel gear, means supporting said member to position said internal bevel gear to engage said external bevel gear with the apex of the pitch cone of the internal bevel gear coincident with the apex of the pitch cone of the external bevel gear, and holding said member against rotation about its own axis, said supporting and holding means comprising a gyratory member to which said internal bevel gear is secured, a ring member mounted for rocking movement about a generally transverse axis, and means supporting said gyratory member on said ring member for rocking movement about an axis disposed 90 degrees in a transverse direction from said first axis, and means for causing said gyratory member to move so that the axis of said internal bevel gear generates a right circular cone the axis of which cone coincides with the axis of said external bevel gear and the apex of which coincides with the apices of the pitch cones of said bevel gear.

3. An epicyclic gearing transmission mechanism comprising, in combination, a housing, a pair of axially aligned driving an driven shafts journaled in said housing, an external bevel gear fixed adjacent the inner end of one of said shafts, a gyratory member including an internal bevel gear having a greater number of teeth than said external bevel gear, supporting means carried by said housing and supporting said gyratory member so as to position said internal bevel gear to engage said external bevel gear, said supporting means holding said gyratory member against rotation about its own axis, a pair of spaced generally axially extending arms carried by said gyratory member, a collar at the ends of said arms, an eccentric carried adjacent the inner end of the other of said shafts and journaled in said collar, a driving shaft extending between said arms and extending at an angle to the axis of said aligned shafts, and means operatively connecting said driving shaft with one of said first-named shafts.

4. A power lift mechanism comprising a shaft, means for optionally rotating said shaft, a crank shaft, an epicyclic gearing transmission mechanism connecting said shafts, said mechanism comprising an external bevel gear on said crank shaft, a member including an internal bevel gear having a greater number of teeth than said external bevel gear, means supporting said member to position said internal bevel gear in engagement with said external bevel gear, said supporting means serving to hold said member against rotation about its own axis but providing for non-rotative gyratory movement of said member about the apex of the pitch cone of said external bevel gear as a center, and means associated with said member for shifting the latter about said center.

5. A power lift mechanism comprising a shaft, means for optionally rotating said shaft, a crank shaft, an epicyclic gearing transmission mechanism connecting said shafts, comprising an external bevel gear on said crank shaft, a member including an internal bevel gear having a greater number of teeth than said external bevel gear, means supporting said member to position said internal bevel gear to engage said external bevel gear and holding said member against rotation about its own axis, and means on said first shaft operatively connected to said member for moving said member so that the axis of said internal bevel gear generates a right circular cone the axis of which coincides with the axis of said external bevel gear.

6. A power lift mechanism comprising a shaft, means for optionally rotating said shaft, a crank shaft in axial alignment with said first shaft, an epicyclic gearing transmission mechanism connecting said shafts and comprising an external bevel gear on said crank shaft, a member including an internal bevel gear having a greater number of teeth than said external bevel gear, means supporting said member to position said internal bevel gear to engage said external bevel gear and holding said member against rotation about its own axis, an eccentric on said first shaft, a follower on said member engaging said eccentric for moving said member so that the axis of said internal bevel gear generates a right circular cone the axis of which coincides with the axis of said external bevel gear, whereby said second shaft is rotated by the rotation of said first shaft, and means responsive to the rotation of said second shaft to a certain position for interrupting the rotation of said first shaft.

7. A power lift mechanism comprising a shaft, means for optionally rotating said shaft, a crank shaft in axial alignment with said first shaft, an epicyclic gearing transmission mechanism connecting said shafts and comprising an external bevel gear on said crank shaft, a member including an internal bevel gear having a greater number of teeth than said external bevel gear, means supporting said member to position said internal bevel gear to engage said external bevel gear and holding said member against rotation about its own axis, an eccentric on said first shaft, and a follower on said member engaging said eccentric for moving said member so that the axis of said internal bevel gear generates a right circular cone the axis of which coincides with the axis of said external bevel gear, whereby said second shaft is rotated by the rotation of said first shaft, and cam means rotatable with said external bevel gear and operative to interrupt the rotation of said first shaft.

8. A power lift mechanism comprising a shaft, means for optionally rotating said shaft, a crank shaft in axial alignment with said first shaft, an epicyclic gearing transmission mechanism connecting said shafts and comprising an external bevel gear on said crank shaft, a member including an internal bevel gear having a greater number of teeth than said external bevel gear, means supporting said member to position said internal bevel gear to engage said external bevel gear and holding said member against rotation about its own axis, an eccentric on said first shaft, and a follower on said member engaging said eccentric for moving said member so that the axis of said internal bevel gear generates a right circular cone the axis of which coincides with the axis of said external bevel gear, whereby said second shaft is rotated by the rotation of said first shaft, means manually shiftable axially on said first shaft for controllably connecting the same with said rotating means therefor, biased means serving to return said last named means to interrupt the transmission of power to said first shaft, a cam carried by said external bevel gear, and means controlled by said cam for governing the interruption of power to said first shaft in accordance with the extent of rotation of the external bevel gear on said crank shaft.

9. A power lift mechanism comprising a housing, driving and driven shafts journaled therein in axial alignment, gear reduction means disposed between the adjacent inner ends of said shafts and operatively connecting the latter, means for driving one of said shafts including a member rotatable on said one shaft and clutch means including a second member optionally engageable with said first member for effecting the rotation of said one shaft, manual means for clutching said members together, biased means for interrupting the transmission of power from one of said members to the other, a cam carried by the other of said shafts, a shiftable rod supported in said housing and extending from a point adjacent said cam alongside said gear reduction means to a point adjacent said members, means carried at one end of said rod and engageable with said cam, and means carried at the other end of said rod for governing the operation of said biased means in accordance with the position of said cam.

10. The combination with a power take-off shaft, of a power lift comprising an intermittently operable shaft disposed at right angles to the power take-off shaft and at one side thereof, means operatively connecting said shafts including a pair of bevel gears and a clutch whereby the second shaft may be intermittently operated from said first power take-off shaft, a crank shaft in axial alignment with said intermittently operable shaft and disposed on the opposite side of said power take-off shaft, means operatively connecting said crank shaft with said intermittently operable shaft comprising an external bevel gear fixed on said crank shaft, a member including an internal bevel gear having a greater number of teeth than said external bevel gear, means supporting said member to position said internal bevel gear to engage said external bevel gear and holding said member against rotation about its own axis, an eccentric upon said intermittently operable shaft, a follower engaging said eccentric, and an arm embracing said power take-off shaft and connecting said bevel gear member with said follower, whereby said member is moved so that the axis of said internal bevel gear generates a cone to cause said crank shaft to be rotated by the rotation of said intermittently operable shaft.

11. The combination with a power take-off shaft, of a power lift comprising a housing, a jack shaft disposed at right angles to said power take-off shaft and at one side thereof, means for optionally connecting said shafts, a crank shaft journaled in said housing in axial alignment with said jack shaft and disposed on the opposite side of said power take-off shaft, means operatively connecting said jack shaft with said crank shaft comprising an external bevel gear fixed on said crank shaft, a member including an internal bevel gear having a greater number of teeth than said external bevel gear, means in said housing supporting said member to position said internal bevel gear to engage said external bevel gear and holding the same against rotation about its own axis, an eccentric on said jack shaft, a follower engaging said eccentric, a pair of arms embracing said power take-off shaft and connecting said bevel gear member with said follower, a bearing support formed integral with said housing and extending into the space between said arms, and a bearing in said bearing support in which said power take-off shaft is journaled.

12. The combination with a power take-off shaft, of a power lift comprising a housing, a jack shaft disposed at right angles to said power take-off shaft and at one side thereof, a bearing in said housing in which one end of said jack shaft is journaled, means for optionally connecting said shafts, a crank shaft journaled in said housing in axial alignment with said jack shaft and disposed on the opposite side of said power take-off shaft, means operatively connecting said jack shaft with said crank shaft comprising an external bevel gear fixed on said crank shaft, a member including an internal bevel gear having a greater number of teeth than said external bevel gear, means in said housing supporting said member to position said internal bevel gear to engage said external bevel gear and holding the same against rotation about its own axis, an eccentric on said jack shaft, a follower engaging said eccentric, a pair of arms embracing said power take-off shaft and connecting said bevel gear member with said follower, a bearing support formed integral with said housing and extending into the space between said arms, a bearing in said bearing support in which said power take-off shaft is journaled, and a second bearing supported in said bearing support in which the other end of said jack shaft is journaled.

13. The combination with a tractor having an opening in the body thereof and a power take-off shaft projecting through said opening, of a housing adapted to be attached to the body of the tractor over said opening and having a substantially cylindrical portion disposed transversely with respect to the axis of said power take-off shaft, said cylindrical portion having openings at each end, a bearing supported in the outer wall of said cylindrical portion in which the end of said power take-off shaft is journaled, a cap removably fixed over each opening in said cylindrical portion, each being provided with a bearing, a jack shaft journaled in the bearing in one of said caps, means for operatively connecting said shafts at will, a crank shaft journaled in the bearing in the other cap, and speed reducing gearing mechanism connecting said crank shaft with said jack shaft.

14. A power lift mechanism comprising a shaft, means for optionally rotating said shaft, a crank shaft, an epicyclic gearing transmission mechanism connecting said shafts, said mechanism comprising an external bevel gear and an internal bevel gear, one of said gears having a greater number of teeth than the other, means supporting one gear in engagement with the other and said other gear being mounted on said crank shaft, said supporting means serving to hold said one gear against rotation about its own axis but providing for non-rotative gyratory movement thereof, and means for gyrating said one gear.

15. A power lift mechanism comprising a shaft, means for optionally rotating said shaft, a crank shaft, an epicyclic gearing transmission connecting said shafts, said mechanism comprising a bevel gear on said crank shaft, a member including a second bevel gear, means supporting said member to position said second bevel gear in engagement with said first gear and for holding said member against rotation about its own axis but providing for non-rotative gyratory movement of said member, one of said bevel gears having a greater number of teeth than the other bevel gear, and an operative connection between said first shaft and said member for causing the latter to move so that the axis of said second bevel gear generates a right circular cone.

16. A power lift mechanism comprising a shaft, means for optionally rotating said shaft, a crank shaft, an epicyclic gearing transmission connecting said shafts, said mechanism comprising a bevel gear on said crank shaft, a member including a second bevel gear, means supporting said member to position said second bevel gear in engagement with said first gear and for holding said member against rotation about its own axis but providing for non-rotative gyratory movement of said member, one of said bevel gears having a greater number of teeth than the other bevel gear, an operative connection between said first shaft and said member for causing the latter to move so that the axis of said second bevel gear generates a right circular cone, means for driving said first shaft, and means responsive to the rotation of said second shaft to a certain position for interrupting said driving means.

17. A power lift mechanism comprising a shaft, means for optionally rotating said shaft, a second shaft in axial alignment with said first shaft, an epicyclic gearing transmission mechanism connecting said shafts and comprising a bevel gear on said second shaft, a member including a second bevel gear, one of said gears having a greater number of teeth than the other, means supporting said member to position said second bevel gear to engage said first bevel gear and holding said member against rotation about its own axis, an eccentric on said first shaft, and a follower on said member engaging said eccentric for moving said member so that the axis of said second bevel gear generates a right circular cone the axis of which coincides with the axis of said first bevel gear, whereby said second shaft is rotated by the rotation of said first shaft, means shiftable axially on said first shaft for controllably connecting the same with said rotating means therefor, biased means serving to return said last named means to interrupt the transmission of power to said first shaft, a cam carried by said first bevel gear, and means controlled by said cam for governing the interruption of power to said first shaft in accordance with the extent of rotation of said second shaft.

NATHAN LESSER.